US008560019B2

(12) United States Patent
Kobayashi

(10) Patent No.: US 8,560,019 B2
(45) Date of Patent: Oct. 15, 2013

(54) WIRELESS COMMUNICATION METHOD, BASE STATION MOBILE STATION, AND WIRELESS COMMUNICATION SYSTEM

(75) Inventor: Takaharu Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 366 days.

(21) Appl. No.: 12/950,278

(22) Filed: Nov. 19, 2010

(65) Prior Publication Data

US 2011/0124346 A1 May 26, 2011

(30) Foreign Application Priority Data

Nov. 25, 2009 (JP) ................................ 2009-267731

(51) Int. Cl.
*H04M 1/00* (2006.01)
*H04B 7/00* (2006.01)

(52) U.S. Cl.
USPC ........ 455/562.1; 455/561; 455/524; 455/560; 455/525

(58) Field of Classification Search
USPC ................ 455/101, 522, 69, 562.1, 561, 524
See application file for complete search history.

(56) References Cited

U.S. PATENT DOCUMENTS 7,480,278 B2 * 1/2009 Pedersen et al. .............. 370/335
8,009,549 B2 * 8/2011 Li et al. ......................... 370/203
2002/0115474 A1 * 8/2002 Yoshino et al. ............... 455/562
2011/0218016 A1 * 9/2011 Hirakawa et al. ............. 455/524

FOREIGN PATENT DOCUMENTS

JP 61-063120 4/1986
JP 2002-232350 8/2002

OTHER PUBLICATIONS

Manabu Inoue, et al. "Space-Time Transmit Site Diversity for OFDM Multi-Base Station System" Technical Report of IEICE, Jul. 1, 2002.
Takamichi Inoue, et al. "A Study on MC-CDMA Site-diversity under shadowing environment" Technical Report of IEICE, Mar. 1, 2004.

* cited by examiner

*Primary Examiner* — Tilahun B Gesesse
(74) *Attorney, Agent, or Firm* — Katten Muchin Rosenman LLP

(57) ABSTRACT

A wireless communication method includes, at each base station, respectively forming first and second communication regions at the edges of a cell of the each base station by changing the direction of a directional antenna in synchronization with other surrounding base stations at a given cycle period, where each first communication region is configured so that a first level is reached in the antenna gain between the sectors contained in the cell of the each base station and the sectors included in the cells of the other base stations, and where each second communication region is configured so that a second level lower than the first level is reached in the antenna gain, and, at each mobile station, combining signals from a given number of base stations during a time period in which the sum of incoming signal levels from the given number of base stations satisfies given conditions.

13 Claims, 14 Drawing Sheets

START
S201 CELL SEARCH TIMING? NO / YES
S202 COMPUTE SITE DIVERSITY GAIN FROM SINR FOR TRANSMISSION FROM SINGLE BS, AND FROM SINR FOR TRANSMISSION FROM MULTIPLE BS
S203 GAIN ≥ THRESHOLD VALUE? YES / NO
S204 ISSUE DEVICE INFORMATION TO MULTIPLE BS CONTAINING SITE DIVERSITY TIME AS ACCESS METHOD AND SINR FOR SITE DIVERSITY
S205 TOTAL SIGNAL POWER FROM MULTIPLE BS
S206 SIGNAL POWER ≥ THRESHOLD VALUE? YES / NO
S207 ISSUE SINR TO BS WITH MAXIMUM SINR
END

WIRELESS COMMUNICATION METHOD, BASE STATION MOBILE STATION, AND WIRELESS COMMUNICATION SYSTEM

CROSS-REFERENCE TO RELATED APPLICATION

This application is based upon and claims the benefit of priority of the prior Japanese Patent Application No. 2009-267731, filed on Nov. 25, 2009, the entire contents of which are incorporated herein by reference.

FIELD

Embodiments discussed herein relate to a wireless communication method, a base station, a mobile station, and a wireless communication system.

BACKGROUND

Wireless communication systems between base stations and mobile stations, such as mobile phone handsets or Personal Handyphone System (PHS) devices, have been in practical use. In such wireless communication systems, a plurality of base stations are provided to form a plurality of cells indicating communication regions. A given mobile station may be contained in one of these cells. The mobile station then performs a hand over from a base station in communication to another base station when moving among cells. Such wireless communication systems are susceptible to the influence of various issues, such as decreased signal levels due to shadowing and propagation loss, as well as increased interference from surrounding cells. In such wireless communication systems, decreased signal levels and increased interference may result in decreased reception (i.e., Signal to Interference plus Noise power Ratio, or SINR), particularly for mobile stations near the edges of cells.

One technique for improving reception involves site diversity, wherein the same signal is made to be transmitted from a plurality of adjacent base stations, with the received signals being combined at the receiving mobile station. Meanwhile, another technique for suppressing interference power involves using directional antennas at the base stations to subdivide cells into equal sectors at specific angles. By means of such techniques, it becomes possible to amplify the desired signal power in wireless communication systems, while also improving reception by suppressing the interference power from surrounding cells.

In addition, there exists technology for such wireless communication systems wherein, for example, the directional antennas at base stations are synchronously rotated, or wherein upper and lower antennas that complement each other's zones are disposed at base stations. In so doing, the region where high bitrate communication is possible (i.e., coverage) can be expanded.

However, in the technology of the related art described above, there is a problem in that the reception is only improved by a small amount. More specifically, in wireless communication systems in accordance with the related art, site diversity or sector formation using directional antennas at the base stations is conducted for mobile stations positioned at the edges of cells, as described above. However, in wireless communication systems of the related art, the incoming power from surrounding cells and sectors is low from the start for mobile stations positioned at the edges of cells. As a result, in wireless communication systems of the related art, the improvement in reception becomes small for mobile stations positioned at the edges of cells where the incoming power is low, even if site diversity is conducted.

SUMMARY

According to an aspect of the embodiments discussed herein, a wireless communication method used in a wireless communication system including base stations and mobile stations is provided. The method includes, at each base station, respectively forming first communication regions and second communication regions at the edges of a cell of the each base station by changing the direction of a directional antenna in synchronization with other surrounding base stations at a given cycle period, wherein each first communication region is configured so that a first level is reached in the antenna gain between the sectors contained in the cell of the each base station and the sectors included in the cells of the other base stations, and wherein each second communication region is configured so that a second level lower than the first level is reached in the antenna gain, and, at each mobile station, combining signals from a given plurality of base stations during a time period in which the sum of incoming signal levels from the given plurality of base stations satisfies given conditions.

It is to be understood that both the foregoing general description and the following detailed description are exemplary and explanatory and are not restrictive of the embodiments, as claimed.

DESCRIPTION OF EMBODIMENTS

Hereinafter, embodiments of the wireless communication method, base station, and mobile station disclosed herein will be described with reference to the attached drawings.

Embodiment 1

Figure 1:
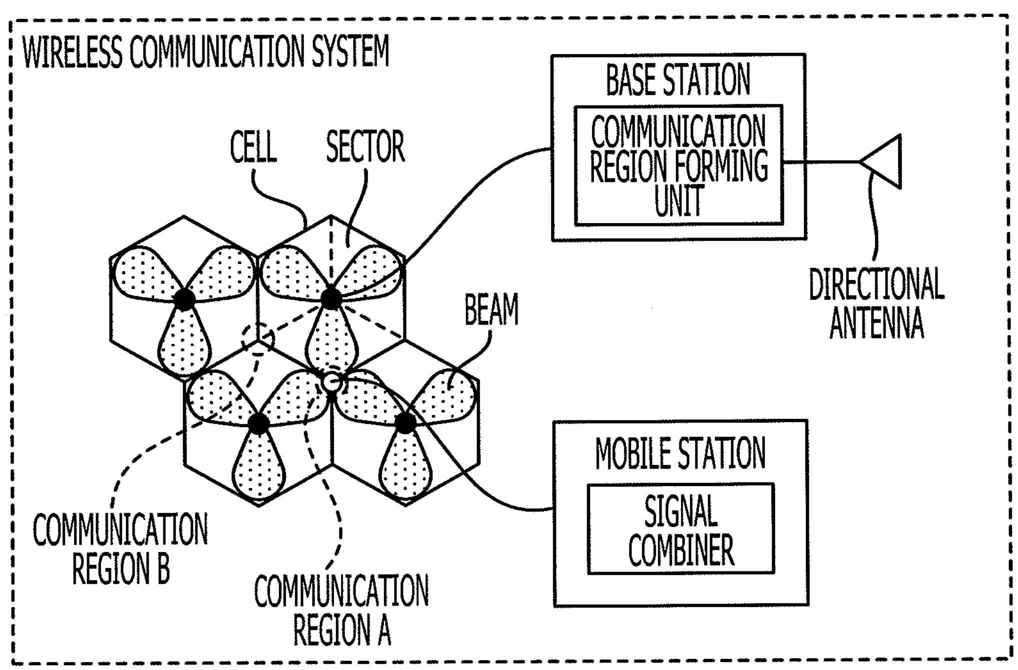
FIG. 1 illustrates an exemplary network configuration of a wireless communication system in accordance with Embodiment 1.

An exemplary network configuration of a wireless communication system in accordance with Embodiment 1 is described using FIG. 1. FIG. 1 illustrates an exemplary network configuration of a wireless communication system in accordance with Embodiment 1.

As illustrated by way of example in FIG. 1, the wireless communication system includes a plurality of base stations and mobile stations. Of these, each base station forms a cell (i.e., a region of communication with that base station), and the base stations are positioned so that the cells are adjacent to each other, for example. Each cell may be respectively formed as the range reachable by beams emitted from a single base station, for example. In addition, sectors herein refer to the sub-regions of a cell that has been equally subdivided at specific angles. Each cell is subdivided by three beams emitted by its corresponding base station. In other words, each cell is subdivided at 120° increments, resulting in three sectors. However, it should be appreciated that the number of beams emitted by a base station is not limited to three.

Meanwhile, the mobile stations may be devices such as mobile phone handsets or Personal Handyphone System (PHS) devices, for example. The mobile stations wireless communicate with other mobile stations and various apparatuses via the base stations. In addition, each mobile station may be contained in one of the cells formed by the base stations, for example. In FIG. 1, the wireless communication system is illustrated as having four base stations and one mobile station. However, it should be appreciated that the numbers of base stations and mobile stations is not limited thereto.

In the configuration described above, each base station includes a communication region forming unit and one or more directional antennas. Also, each mobile station includes a signal combiner. Each directional antenna is controlled by the communication region forming unit, for example, and emits a beam in a given direction. In FIG. 1, each base station is illustrated as having one directional antenna, but the number of installed antennas varies according to the number of beams to be emitted. An array antenna is one example of the one or more directional antennas described herein.

The communication region forming unit changes the direction of the directional antenna in synchronization with adjacent base stations at a given cycle period, for example. The communication region forming unit forms communication region A at the edge of its (i.e., the current) cell. The communication region A is formed so that a first level is reached in the antenna gain between a sector contained in the current cell and the adjacent sectors contained in adjacent cells adjacent to the current cell and the current sector. In addition, the communication region forming unit forms a communication region B at the edge of the current cell. The communication region B is formed so that a second level lower than the first level is reached in the antenna gain. In the example illustrated in FIG. 1, the mobile station is positioned inside the communication region A, and the communication region A is taken to be the region where the mobile station receives the maximum antenna gain from a plurality of base stations. Also, in the example illustrated in FIG. 1, the communication region B is taken to be the region where the mobile station receives the minimum antenna gain from a plurality of base stations.

Meanwhile, the mobile station may, for example, combine the signals from the plurality of base stations once the gain between the incoming signal level from a given base station and the sum of incoming signal levels from the plurality of base stations becomes equal to or greater than a given gain. In other words, the mobile station performs site diversity by combining signals from a plurality of base stations once a communication region A is formed by a plurality of base stations, the communication region A being a region where the sum of incoming signal levels from the plurality of base stations becomes particularly stronger than the incoming signal from a single base station.

In other words, in the wireless communication system, the directions of directional antennas are changed in synchronization among a plurality of base stations, and site diversity is performed in a mobile station positioned in a communication region where the antenna gain becomes greater than in other communication regions. As a result, it is possible to further improve reception in the wireless communication system compared to the related art, wherein site diversity is conducted by mobile stations positioned in regions of low incoming signal power.

Embodiment 2

Figure 2:
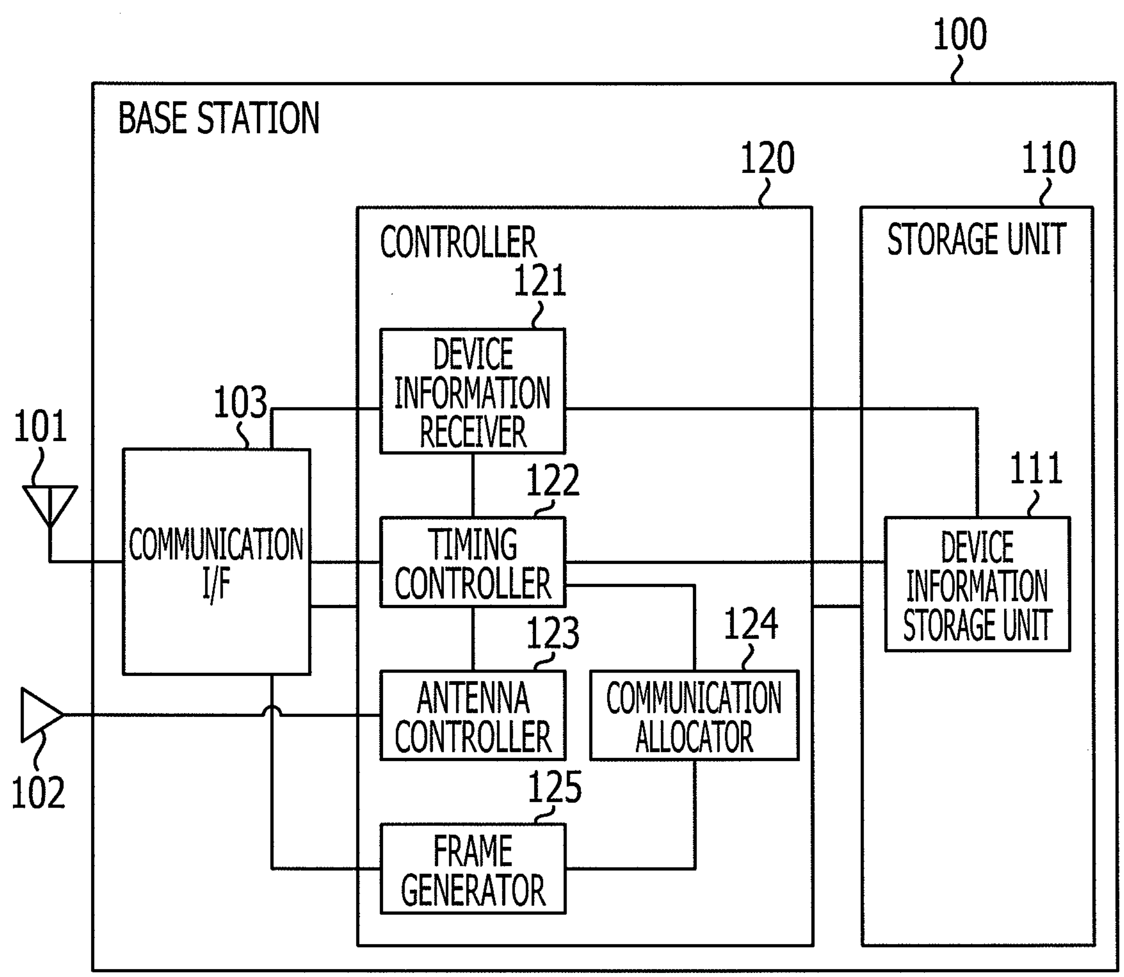
FIG. 2 illustrates an exemplary configuration of a base station in accordance with Embodiment 2.

An exemplary configuration of a base station in accordance with Embodiment 2 is described using FIG. 2. FIG. 2 illustrates an exemplary configuration of a base station in accordance with Embodiment 2.

As illustrated by way of example in FIG. 2, the base station 100 includes a communication antenna 101, directional antenna 102, a communication interface (I/F) 103, a storage unit 110, and a controller 120.

The communication antenna 101 sends and receives various information involved in communication with mobile stations inputting and outputting with respect to the base station 100, as well as with base stations other than the base station 100, for example. The communication antenna 101 inputs the various received information into the communication I/F 103. The directional antenna 102 is controlled by an antenna controller 123 hereinafter described, and emits beams in given directions, for example.

Beams emitted by the directional antenna 102 are controlled so that the antenna direction is switched at a given cycle period, with the base station 100 and surrounding base station in synchronization with each other. Additionally, the beams emitted by the directional antenna 102 respectively form communication regions where the antenna gain is maximized and communication regions where the antenna gain is minimized at the edges of the cell of each base station. The directional antenna in accordance with Embodiment 1 is one example of the directional antenna 102 described herein.

The communication I/F 103 controls data transfer of the various information that is sent and received among various apparatus via the communication antenna 101, such as mobile stations and base stations other than the base station 100, for example. Herein, the communication I/F 103 may, for example, be connected to the following components hereinafter described: the device information receiver 121, the timing controller 122, and the frame generator 125.

The storage unit 110 stores data used in various processes executed by the controller 120 as well as the results of various processes executed by the controller 120, and includes a device information storage unit 111. The storage unit 110 may be a semiconductor memory element such as random access memory (RAM), read-only memory (ROM), or flash memory, or a storage device such as a hard disk or optical disc, for example.

The device information storage unit 111 stores information input by the device information receiver 121 described hereinafter, for example. One example of the information stored by the device information storage unit 111 is device-specific access methods for each mobile station, such as normal access times, site diversity times, and non-access times. Another example of the information stored by the device information storage unit 111 is the reception (i.e., the Signal to Interference plus Noise power Ratio, or SINR).

At any given time, a mobile station may belong to one of the following time slots: the time when normal access is possible, the time when site diversity is possible, and the time of no access. The device information storage unit 111 stores information indicating the time slot to which each mobile station belongs. Hereinafter, such information that indicates the time slot to which a mobile station belongs may be defined as equivalent to information that indicates which access method has been selected.

The normal access time for an access method may, for example, refer to the time period during which a mobile station is positioned inside a cell formed by the base station 100, and during which the mobile station can access the base station 100 while maintaining a certain level of reception quality as a result of a beam emitted by the base station 100.

The site diversity time may, for example, refer to the time period during which a mobile station is positioned at the edges of respective cells formed by the base station 100 and other base stations, and during which site diversity can be performed by utilizing beams emitted by all base stations. However, the time during which site diversity is performed may be taken to be close to the time during which a communication region of maximum antenna gain is formed by the directional antenna 102 and the directional antennas of other base stations, for example. In other words, reception quality during the site diversity time is further improved over a given reception quality for the normal access time.

The non-access time may, for example, refer to the time period during which a mobile station is positioned at the edges of respective cells formed by the base station 100 and other base stations, but during which the mobile station is not accessing the base station 100 (i.e., no wireless resources are allocated). However, the non-access time may be taken to be close to the time during which a communication region of minimum antenna gain is formed by the directional antenna 102 and the directional antennas of other base stations, for example. In other words, since the reception quality during the non-access time drops below a given reception quality for the normal access time, no wireless resources are allocated to the base station 100 by the mobile station during this time. The selection of the access method by a mobile station may be later described in detail.

The controller 120 controls the base station 100, and includes internal memory for storing a control program, programs stipulating various processing sequences or other protocols, and relevant data. In addition, the controller 120 includes a device information receiver 121, a timing controller 122, an antenna controller 123, a communication allocator 124, and a frame generator 125. The controller 120 herein may be an integrated circuit such as an application-specific integrated circuit (ASIC) or a field-programmable gate array (FPGA). Alternatively, the controller 120 may be an electronic circuit such as a central processing unit (CPU) or a micro processing unit (MPU).

Via the communication antenna 101 and the communication I/F 103, the device information receiver 121 receives device information sent by a mobile station, for example. The device information contains the reception quality and the access method, and is stored in the device information storage unit 111. In addition, the device information receiver 121 notifies the timing controller 122 that device information has been received, for example. Herein, the reception quality received by the device information receiver 121 is the reception quality for the mobile station with respect to the base station 100, and may be calculated by the mobile station based on a reference signal output from the base station 100, for example.

The timing controller 122 communicates with surrounding base stations other than the base station 100 in order to synchronize the cycle period by which the direction of the directional antenna 102 is changed, for example. Additionally, the timing controller 122 notifies the antenna controller 123 with timing information indicating when the direction of the directional antenna 102 is to be changed, for example. If the timing controller 122 receives a notification from the device information receiver 121 indicating that device information has been received, then the timing controller 122 acquires the device information from the device information storage unit 111, and notifies the communication allocator 124, for example. Herein, the communication with the base stations surrounding the base station 100 may be conducted by wired communication using a cable or other medium, or alternatively, by wireless communication using the communication I/F 103 or Global Positioning System (GPS) satellites, for example.

The antenna controller 123 changes the direction of the directional antenna 102 in synchronization with adjacent base stations at a given cycle period, for example. The antenna controller 123 forms communication regions at the edges of its (i.e., the current) cell wherein the antenna gain is maximized and minimized, respectively, between the current sectors contained in the current cell and the adjacent sectors contained in adjacent cells. The communication region forming unit in accordance with Embodiment 1 is one example of the antenna controller 123 described herein.

Figure 3:
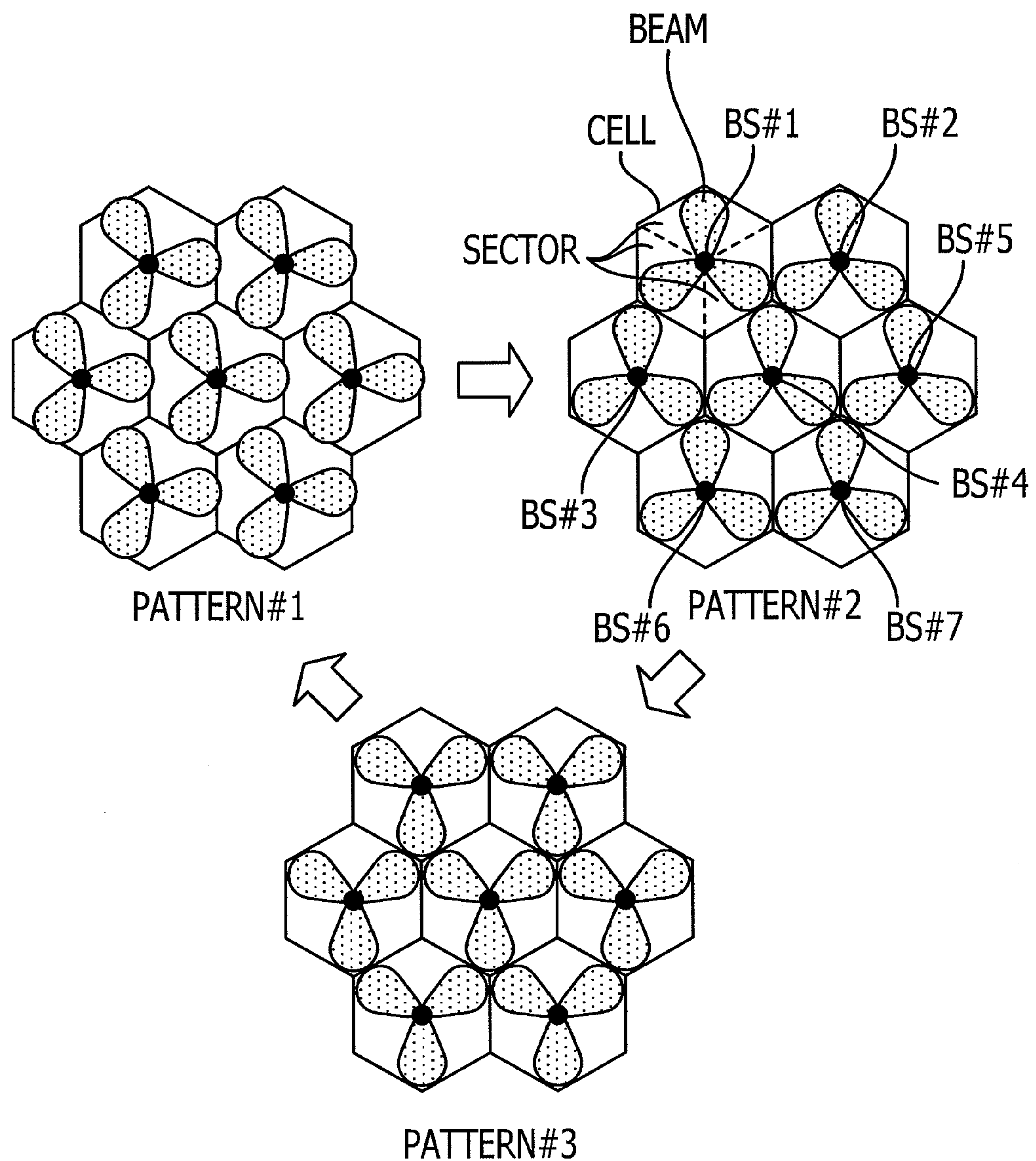
FIG. 3 is a diagram for explaining an example of switching the beams emitted by a base station in accordance with Embodiment 2.

FIG. 3 illustrates an example of switching the beams emitted by the base station 100 in accordance with Embodiment 2. FIG. 3 is a diagram for explaining an example of switching the beams emitted by the base station 100 in accordance with Embodiment 2. FIG. 3 illustrates an example wherein base stations BS#1 to BS#7 form cells and sectors, with beams being emitted by each BS.

As illustrated by way of example in FIG. 3, BS#1 to BS#7 switch beams by changing the direction of their directional antennas in synchronization with each other at the given cycle periods given by Pattern#1 to Pattern#3. In the example illustrated in FIG. 3, each BS emits beams at equal intervals so that the hexagonal cell is subdivided into three sectors every 120°. In so doing, each BS forms communication regions where the antenna gain is maximized, as well as communication regions where the antenna gain is minimized. These communication regions exist at the cell edges near the points where the hexagonal vertices meet.

Also, in the example illustrated in FIG. 3, the communication regions wherein the antenna gain is maximized or minimized for mobile stations positioned at the cell edges are produced during Pattern#2 and Pattern#3. In contrast, in the example illustrated in FIG. 3, the communication regions wherein the antenna gain is maximized or minimized are not produced during Pattern#1.

Returning to FIG. 2, the communication allocator 124 schedules resources based on the device information issued by the timing controller 122, for example. In this scheduling, mobile stations in site diversity time are given priority when allocating wireless resources. The communication allocator 124 then notifies the frame generator 125 of the scheduling for respective mobile stations.

The scheduling conducted by the communication allocator 124 may also prioritize mobile stations in site diversity time first, then mobile stations in normal access time, and mobile stations in non-access time may not be scheduled at all, for example. In addition, in the scheduling for respective access methods, mobile stations with particularly high reception quality may be prioritized first, and wireless resources may be allocated while prioritizing mobile stations with low per-sector throughput but high instantaneous throughput.

This scheduling technique is also referred to as proportional fairness (PF). When PF scheduling is conducted, there is a possibility that a mobile station may be communicating in a different sector each time the antenna direction changes. For this reason, the mobile station's throughput information is considered to not indicate just one sector, but instead to be distributed over other sectors. Consequently, it is desirable to compute the average throughput of each mobile station not on a per-sector basis, but rather for all sectors at once.

Figure 4:
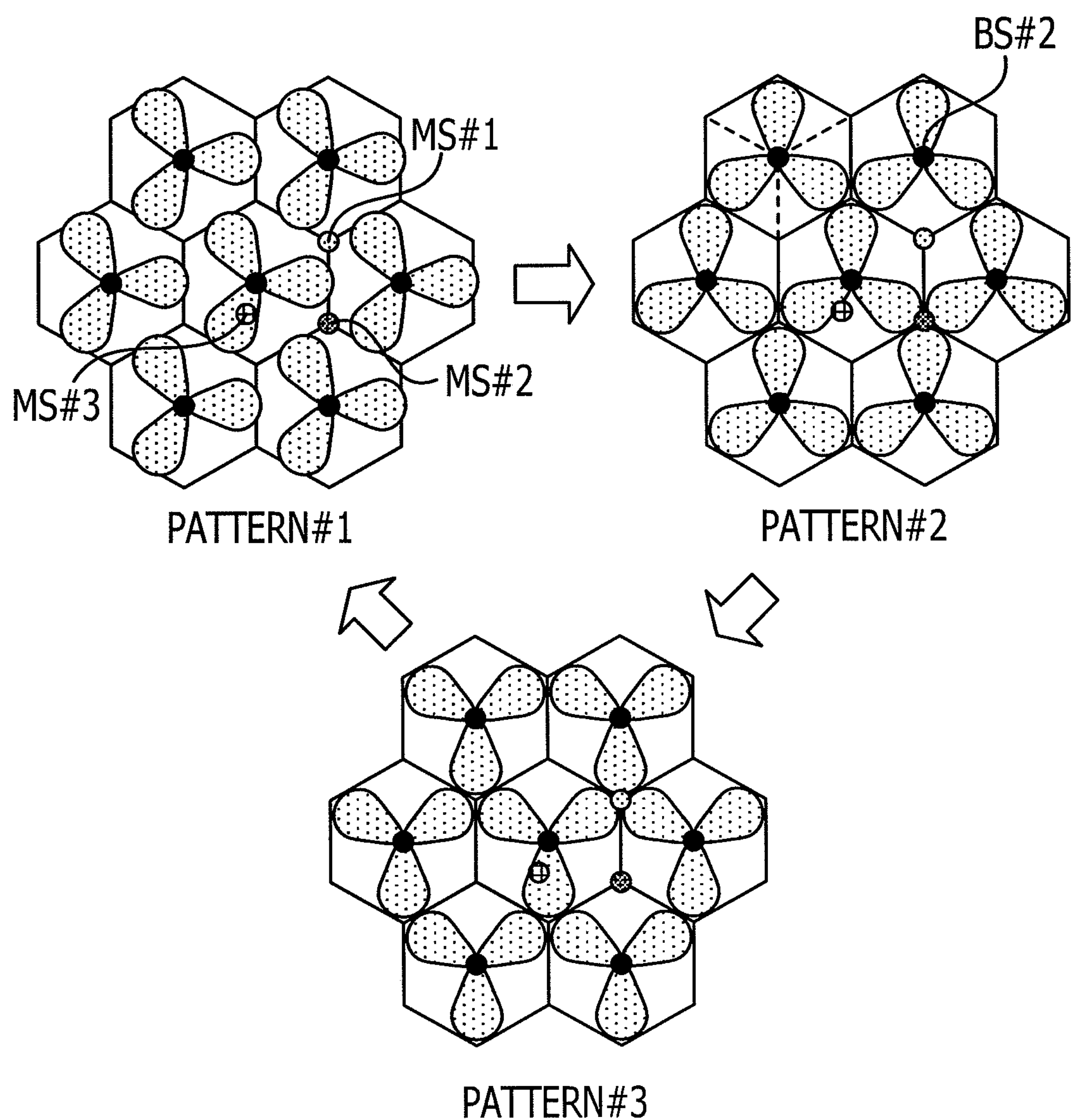
FIG. 4 is a diagram for explaining an example of the allocation timing for communication with respect to mobile stations by a base station in accordance with Embodiment 2.
Figure 5:
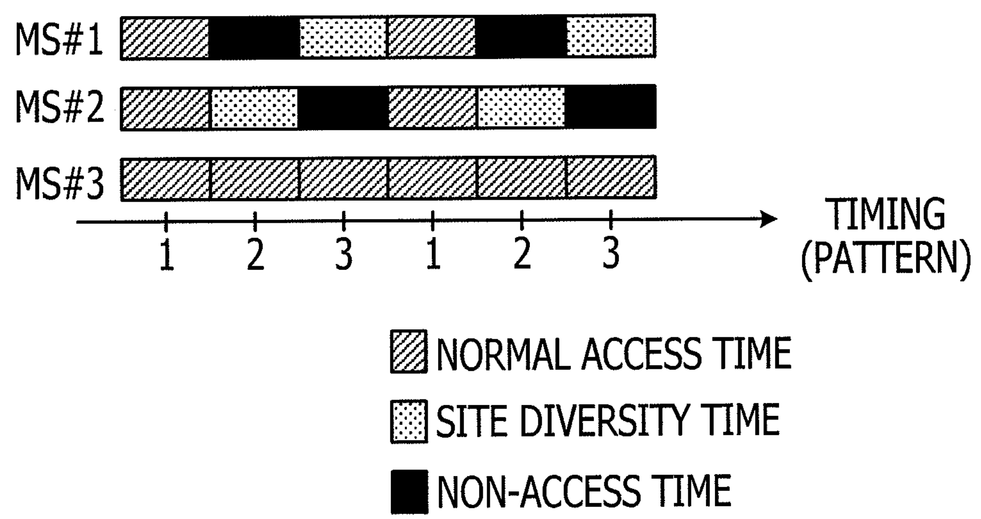
FIG. 5 is a diagram for explaining an example of the allocation details for communication with respect to mobile stations by a base station in accordance with Embodiment 2.

FIGS. 4 and 5 illustrate an example of allocation timing for communication with respect to mobile stations by the base station 100 in accordance with Embodiment 2. FIG. 4 is a diagram for explaining an example of the allocation timing for communication with respect to mobile stations by the base station 100 in accordance with Embodiment 2. FIG. 5 is a diagram for explaining an example of the allocation details for communication with respect to mobile stations (MS) by the base station 100 in accordance with Embodiment 2. In FIG. 4, mobile stations positioned inside given cells are respectively labeled MS#1, MS#2, and MS#3. Of these, MS#1 and MS#2 represent mobile stations positioned at the edges of cells. Also, base stations BS#1 to BS#7 are illustrated, similarly to FIG. 3.

As illustrated by way of example in FIGS. 4 and 5, when the antenna gain is the result of the beams illustrated in Pattern#1, MS#1 to MS#3 are able to access respective base stations in normal access time. It is desirable that these respective base stations be the base stations that are able to communicate with the best reception quality at each MS.

Meanwhile, MS#3 is able to access a particular base station in normal access time even when the antenna gain is the result of the beams illustrated in Pattern#2 and Pattern#3, for example. In this way, since MS#3 is not positioned at the edges of cells, MS#3 becomes a mobile station that is continuously able to access a particular base station in normal access time.

When the antenna gain is the result of the beams illustrated in Pattern#2, MS#1 is in non-access time, and does not access a base station, for example. When the antenna gain is the result of the beams illustrated in Pattern#3, MS#1 is in site diversity time, and conducts site diversity to combine signals from multiple BSs, for example. In this way, since MS#1 is positioned at the edges of cells, its access method changes as the antenna direction changes.

Meanwhile, when the antenna gain is the result of the beams illustrated in Pattern#2, MS#2 is in site diversity time, and conducts site diversity to combine signals from multiple BSs, for example. When the antenna gain is the result of the beams illustrated in Pattern#3, MS#2 is in non-access time, and does not access a base station, for example. In this way, since MS#2 is positioned at the edges of cells, its access method changes as the antenna direction changes.

Returning to FIG. 2, the frame generator 125 generates wireless frames containing the scheduling issued by the communication allocator 124, and then respectively transmits these frames to corresponding mobile stations, for example. Herein, the transmission of wireless frames by the frame generator 125 to respective mobile stations is conducted via the communication I/F 103 and the communication antenna 101.

Figure 6:
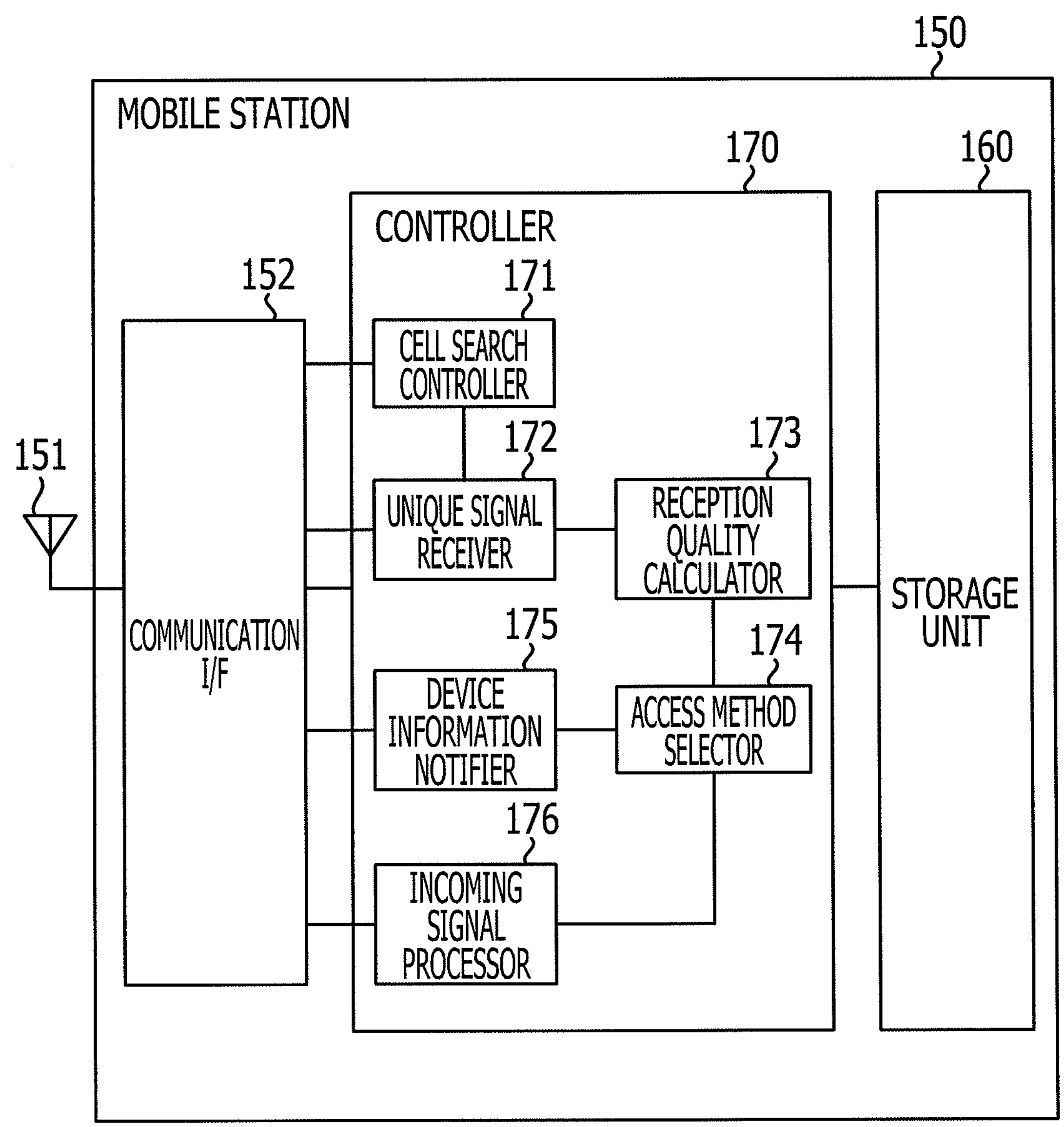
FIG. 6 illustrates an exemplary configuration of a mobile station in accordance with Embodiment 2.

An exemplary configuration of a mobile station in accordance with Embodiment 2 is described using FIG. 6. FIG. 6 illustrates an exemplary configuration of a mobile station in accordance with Embodiment 2.

As illustrated by way of example in FIG. 6, the mobile station 150 includes a communication antenna 151, a communication I/F 152, a storage unit 160, and a controller 170.

The communication antenna 151 sends and receives various information involved in communication with base stations inputting and outputting with respect to the mobile station 150, as well as with other mobile stations, for example. The communication antenna 151 inputs the various received information into the communication I/F 152.

The communication I/F 152 controls data transfer of the various information that is sent and received among various apparatuses via the communication antenna 151, such as base stations and mobile stations, for example. Herein, the communication I/F 152 may, for example, be connected to the following components hereinafter described: the cell search controller 171, the unique signal receiver 172, the device information notifier 175, and the incoming signal processor 176.

The storage unit 160 stores data used in various processes executed by the controller 170 as well as the results of various processes executed by the controller 170. The storage unit 160 may be a semiconductor memory element such as RAM, ROM, or flash memory, or a storage device such as a hard disk or optical disc, for example.

The controller 170 controls the mobile station 150, and includes internal memory for storing a control program, programs stipulating various processing sequences or other protocols, and relevant data. In addition, the controller 170 includes a cell search controller 171, a unique signal receiver 172, a reception quality calculator 173, an access method selector 174, a device information notifier 175, and an incoming signal processor 176. The controller 170 herein may be an integrated circuit such as an ASIC or an FPGA. Alternatively, the controller 120 may be an electronic circuit such as a CPU or an MPU.

Via the communication antenna 151 and the communication I/F 152, the cell search controller 171 receives direction change timings for the directional antenna 102 sent by the base station 100. These direction change timings are saved in given memory. Based on saved direction change timings, the cell search controller 171 notifies the unique signal receiver 172 at the times when the direction of the directional antenna 102 changes. However, it should be appreciated that the direction change timings for a directional antenna that are sent by the cell search controller 171 are not limited to being received from the base station 100.

Once direction change timings have been issued by the cell search controller 171, the unique signal receiver 172 receives a reference signal sent by a base station, and received via the communication antenna 151 and the communication I/F 152, for example. This reference signal is then input into the reception quality calculator 173.

In addition, once direction change timings have been issued by the cell search controller 171, the unique signal receiver 172 receives reference signals sent by a plurality of base stations, and received via the communication antenna 151 and the communication I/F 152. The unique signal receiver 172 inputs the received reference signals into the reception quality calculator 173. In other words, at each direction change timing when the direction of the directional antenna 102 of the base station 100 changes in synchronization with surrounding base stations, the unique signal receiver 172 inputs into the reception quality calculator 173 reference signals that have been sent from the base station 100 as well as a plurality of other base stations.

Based on the reference signals input by the unique signal receiver 172, the reception quality calculator 173 computes the reception quality at the mobile station 150, and notifies the access method selector 174, for example. In the reception quality computation by the reception quality calculator 173 herein, two reception qualities are calculated: one reception quality based on the reference signal sent by a single base station, and another reception quality based on the reference signals sent by a plurality of base stations.

Based on the reception qualities issued by the reception quality calculator 173, the access method selector 174 selects an access method with respect to the base station 100 or another base station, and issues device information containing the reception quality and the access method to the device information notifier 175, for example. In addition, the access method selector 174 also issues the timings by which the mobile station 150 is to perform site diversity to the incoming signal processor 176.

In the selection of an access method by the access method selector 174, the reception quality based on the reference signal sent from a single base station is subtracted from the reception quality based on the reference signals sent from a plurality of base stations, thereby computing the gain in the case of conducting site diversity. If the computed gain is equal to or greater than a given gain, then the access method selector 174 selects the site diversity time from among the access methods.

In contrast, if the computed gain is less than the given gain, then the access method selector 174 next determines whether or not the sum of incoming signal levels from the surrounding plurality of base stations is equal to or greater than a given level. If the sum of incoming signal levels is equal to or greater than the given level, then the access method selector 174 selects the normal access time from among the access methods. If the sum of incoming signal levels is less than the given level, then the access method selector 174 selects the non-access time from among the access methods.

The device information notifier 175 notifies one or more base stations with the device information issued by the access method selector 174. If the access method is the site diversity time, for example, then the device information notifier 175 issues the device information to a plurality of base stations. If the access method is the normal access time, for example, then the device information notifier 175 issues the device information to the base station with the best reception quality from among the surrounding plurality of base stations.

At the site diversity timings issued by the access method selector 174, the incoming signal processor 176 performs site diversity to combine incoming signals received via the communication antenna 151 and the communication I/F 152, for example. In addition, the incoming signal processor 176 also performs normal signal receiving processes during the normal access time or site diversity time, for example. The signal combiner in accordance with Embodiment 1 is one example of the reception quality calculator 173, the access method selector 174, and the incoming signal processor 176 described herein.

Figure 7:
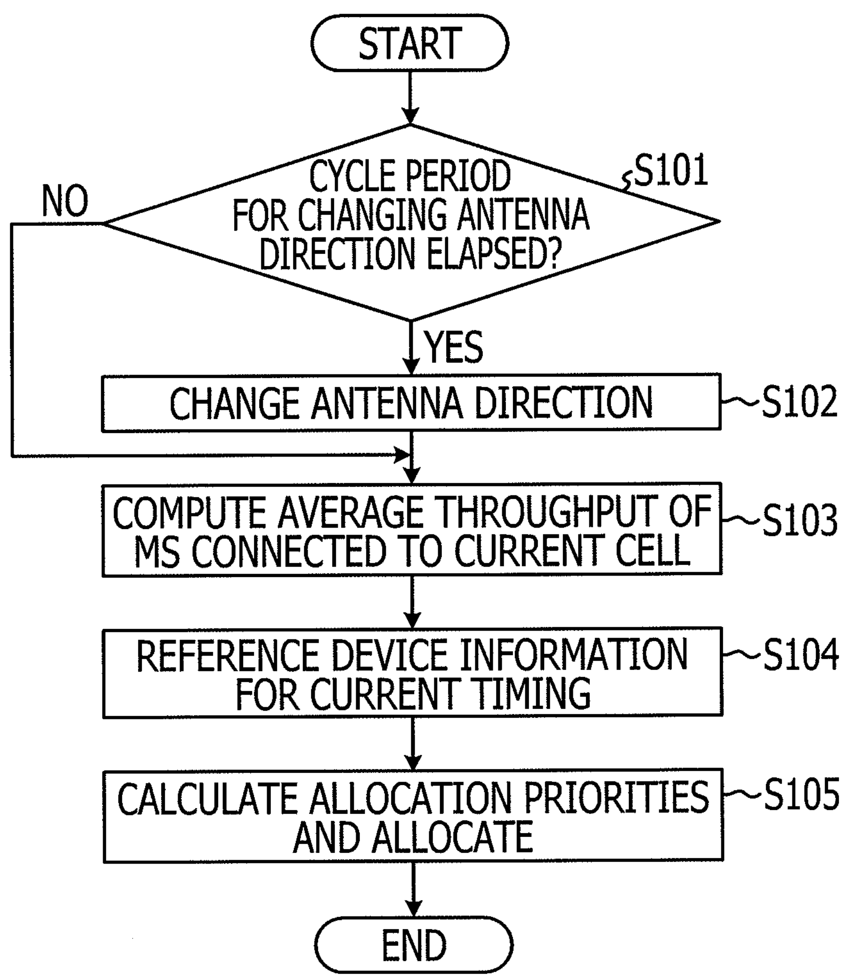
FIG. 7 is a flowchart explaining the flow of a communication allocation process in accordance with Embodiment 2.

FIG. 7 illustrates the flow of a communication allocation process in accordance with Embodiment 2. FIG. 7 is a flowchart explaining the flow of a communication allocation process in accordance with Embodiment 2. Herein, the communication allocation process refers to a process executed by a base station 100 in accordance with Embodiment 2.

As illustrated by way of example in FIG. 7, if the cycle period for changing the direction of the directional antenna 102 has elapsed (operation S101, Yes), then the base station 100 changes the direction of the directional antenna 102 (operation S102). If the cycle period for changing the direction of the directional antenna 102 has not elapsed (operation S101, No), then the base station 100 performs the following operation S103.

The base station 100 computes the average throughput for each mobile station connected inside the current cell (i.e., the communication region of the current base station 100) (operation S103). Subsequently, the base station 100 acquires device information for the current direction of the directional antenna 102 (i.e., device information for site diversity time, normal access time, or non-access time) from the device information storage unit 111 (operation S104).

Based on the acquired device information, the base station 100 computes priorities, with resource allocation prioritizing site diversity time over normal access time. The base station 100 then conducts scheduling to allocate wireless resources based on the computed priorities (operation S105). The base station 100 then notifies each mobile station of the scheduling determined as above.

Figure 8:
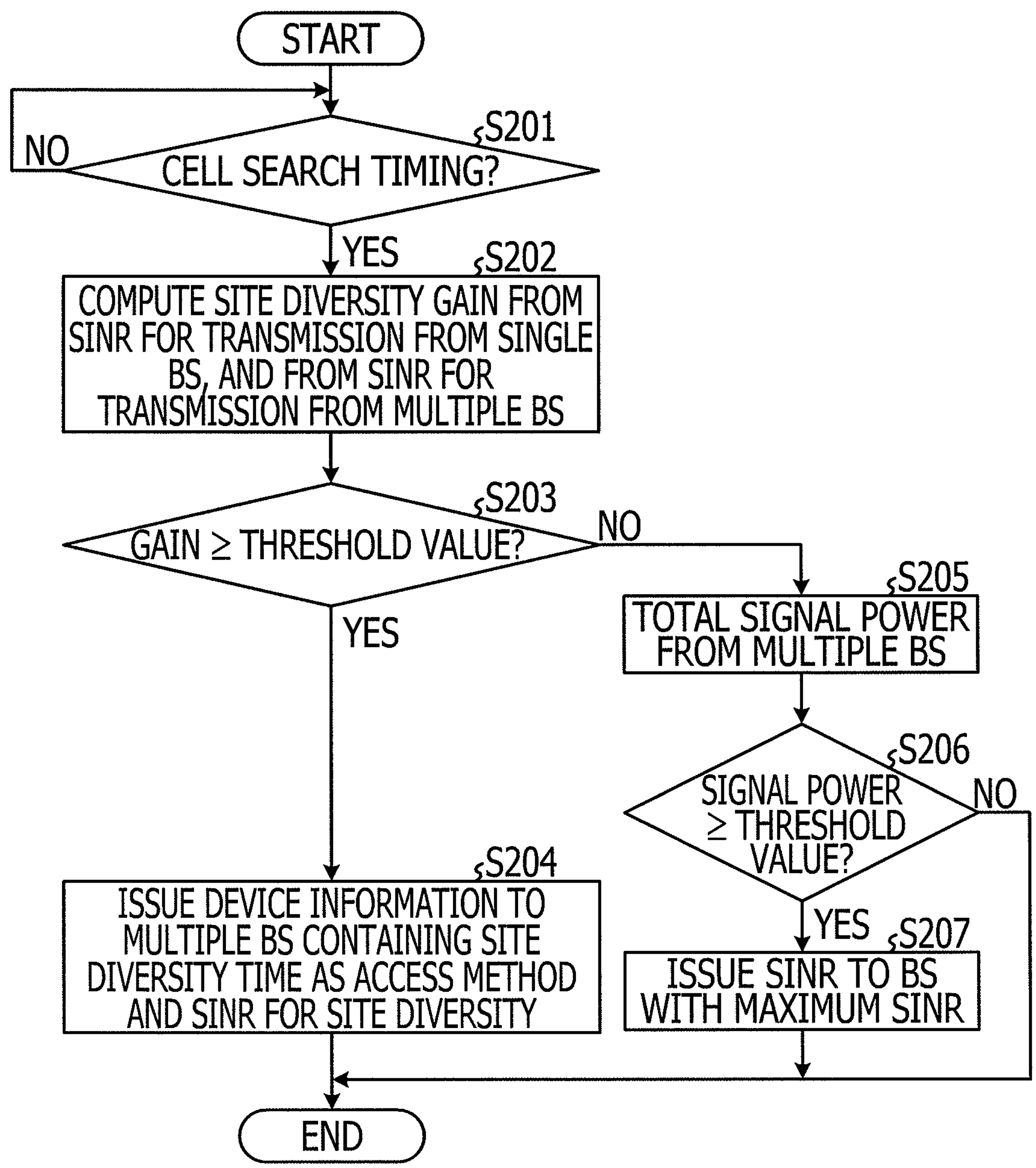
FIG. 8 is a flowchart explaining the flow of a cell search process in accordance with Embodiment 2.

FIG. 8 illustrates the flow of a cell search process in accordance with Embodiment 2. FIG. 8 is a flowchart explaining the flow of a cell search process in accordance with Embodiment 2. Herein, the cell search process refers to a process conducted by a mobile station 150 in accordance with Embodiment 2.

As illustrated by way of example in FIG. 8, the mobile station 150 determines whether or not a cell search timing has been reached, based on a cycle period for changing the direction of the directional antennas of the base stations that has been stored in advance (operation S201). If a cell search timing has been reached (operation S201, Yes), then the mobile station 150 computes the site diversity gain from the reception quality for transmission of a reference signal from a single base station, and from the reception quality for transmission of a reference signal from a plurality of base stations (operation S202). Meanwhile, if a cell search timing has not been reached (operation S201, No), then the mobile station 150 waits in standby until the cell search timing is reached.

If the computed gain is equal to or greater than a given gain (operation S203, Yes), then the mobile station 150 issues device information to a plurality of base stations (operation S204). The device information at this point indicates site diversity time as the access method, and also includes the reception quality for the case of conducting site diversity.

In contrast, if the computed gain is less than the given gain (operation S203, No), then the mobile station 150 computes the sum of incoming signal levels from a plurality of base stations (S205). The mobile station 150 subsequently determines whether or not the computed incoming signal level is equal to or greater than a given level (operation S206).

If the incoming signal level is equal to or greater than the given level (operation S206, Yes), then the mobile station 150 issues device information to the base station with the best incoming signal level (operation S207). The device information at this point indicates normal access time as the access method, and also includes the incoming signal level with respect to that base station. Meanwhile, if the incoming signal level is less than the given level (operation S206, No), then the mobile station 150 recognizes a non-access time. However, a mobile station in non-access time may still notify a given base station of site diversity time or normal access time, for example.

As described above, in a wireless communication system, beams are emitted in synchronization with surrounding base stations at a given cycle period, and scheduling is conducted by base stations based on a per-cycle access method obtained from factors such as the reception quality for each mobile station. Furthermore, by means of the scheduling conducted by the base stations, throughput is efficiently improved as a result of site diversity conducted by mobile stations positioned at the edges of cells. Given such advantages, reception quality can be further improved in the wireless communication system.

Embodiment 3

In the above Embodiment 2, a mobile station is described as not accessing a base station during non-access time, but it should be appreciated that the mobile station may also communicate with other apparatuses during the non-access time. For this reason, the following may describe the case where a mobile station communicates with other apparatuses during non-access time.

Figure 9:
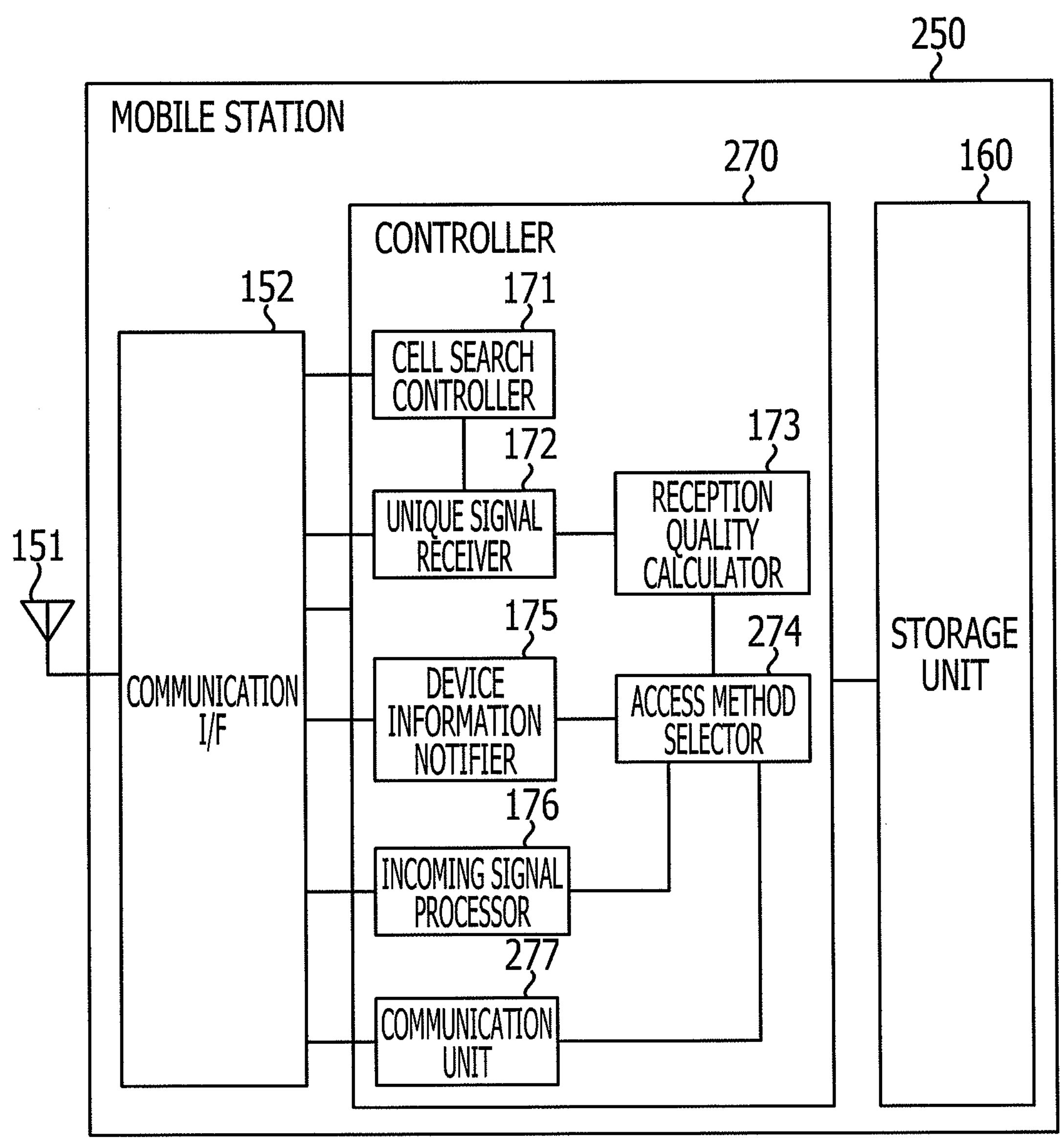
FIG. 9 illustrates an exemplary configuration of a mobile station in accordance with Embodiment 3.

FIG. 9 illustrates an exemplary configuration of a mobile station in accordance with Embodiment 3. In FIG. 9 herein, configuration elements that are similar to those of the mobile station 150 in accordance with Embodiment 2 may be given identical reference numbers, and description of processes that are similar to those of the mobile station 150 in accordance with Embodiment 2 may be omitted.

As illustrated by way of example in FIG. 9, the mobile station 250 includes a communication antenna 151, a communication I/F 152, a storage unit 160, and a controller 270.

The storage unit 160 stores data used in various processes executed by the controller 270 as well as the results of various processes executed by the controller 270. The storage unit 160 may be a semiconductor memory element such as RAM, ROM, or flash memory, or a storage device such as a hard disk or optical disc, for example.

The controller 270 controls the mobile station 250, and includes internal memory for storing a control program, programs stipulating various processing sequences or other protocols, and relevant data. In addition, the controller 270 includes a cell search controller 171, a unique signal receiver 172, a reception quality calculator 173, an access method selector 274, a device information notifier 175, an incoming signal processor 176, and a communication unit 277. The controller 270 herein may be an integrated circuit such as an ASIC or an FPGA, or an electronic circuit such as a CPU or an MPU.

The access method selector 274 notifies the communication unit 277 of the timings when the mobile station 250 is in non-access mode, for example. When in the non-access time as notified by the access method selector 274, the communication unit 277 communicates with a transponder that relays access with respect to the base stations.

Since the configuration and processing flows related to the transponder are similar to those of the mobile station 250, detailed description thereof is herein omitted. Similarly to the mobile station 250, the transponder issues device information indicating the timings at which the transponder is able to access a particular base station, and wireless resources are then allocated to the transponder by the base station. The particular combination of a relaying transponder and a mobile station may be selected by a base station having device information for both devices, for example.

In other words, based on device information issued from both the mobile station 250 and the transponder, a base station selects the combination of the mobile station 250 and the transponder, and specifies communication between the transponder and the mobile station 250 when both are in non-access time.

Figure 10:
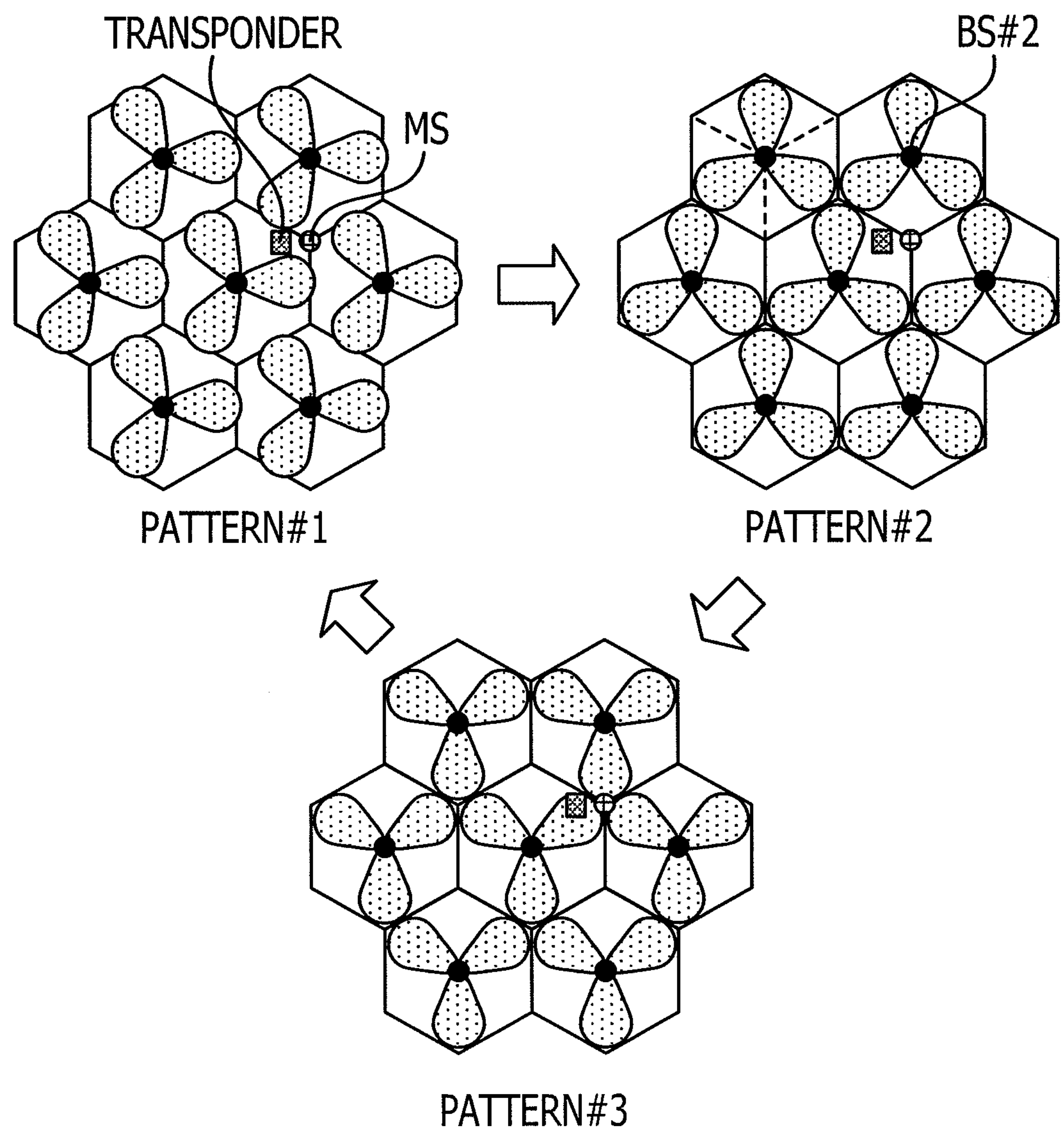
FIG. 10 is a diagram for explaining an example of the allocation timing for communication with respect to mobile stations by a base station in accordance with Embodiment 3.
Figure 11:
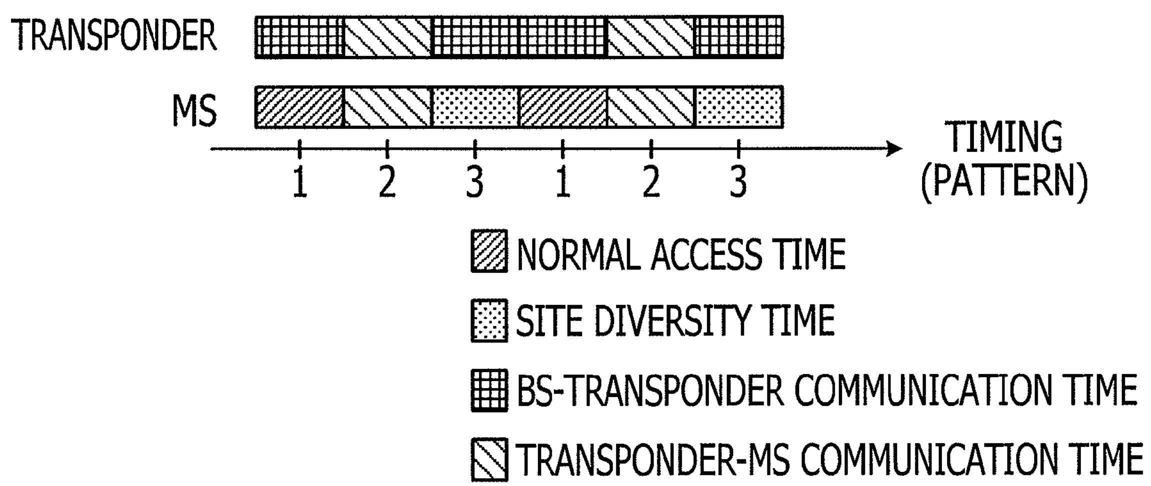
FIG. 11 is a diagram for explaining an example of the allocation details for communication with respect to mobile stations by a base station in accordance with Embodiment 3.

FIGS. 10 and 11 illustrate an example of the allocation timing for communication with respect to a mobile station 250 by a base station 100 in accordance with Embodiment 3. FIG. 10 is a diagram for explaining an example of the allocation timing for communication with respect to a mobile station 250 by a base station 100 in accordance with Embodiment 3. FIG. 11 is a diagram for explaining an example of the allocation details for communication with respect to a mobile station 250 by a base station 100 in accordance with Embodiment 3. In FIG. 10, a mobile station 250 positioned inside a given cell is labeled MS. Also, base stations BS#1 to BS#7 are illustrated, similarly to FIG. 3.

As illustrated by way of example in FIGS. 10 and 11, when the antenna gain is the result of the beams illustrated in Pattern#1, the MS and the transponder are able to access respective base stations in normal access time. It is desirable that these respective base stations be the base stations that are able to communicate with the best reception quality at each MS. In FIG. 11, the normal access time for the transponder is labeled "BS-Transponder communication time".

Meanwhile, when the antenna gain is the result of the beams illustrated in Pattern#2, the MS and the transponder are in non-access time, and do not access base stations, for example. At this point, the MS and the transponder are able to communicate with each other in the "Transponder-MS communication time".

When the antenna gain is the result of the beams illustrated in Pattern#3, the MS is in site diversity time, and conducts site diversity to combine signals from multiple BSs, for example. On the other hand, when the antenna gain is the result of the beams illustrated in Pattern#3, the transponder is in the "BS-Transponder communication time", which corresponds to the normal access time of an MS.

As described above, in a wireless communication system, a non-access time period is defined, wherein a mobile station is made to not access a base station when the communication resulting from such access would be unsatisfactory. In addition, in the wireless communication system, communication between a transponder and a mobile station is performed during the non-access time. As a result, it becomes possible to decrease mutual interference in the wireless communication system with respect to different communication protocols between a base station and a mobile station on the one hand, and a transponder and a mobile station on the other. Moreover, it is possible to improve the throughput of the wireless communication system as a whole.

Embodiment 4

The above Embodiment 3 describes the case of communication between a transponder and a mobile station during non-access time. However, it is also possible for the mobile station to communicate with each other. For this reason, the following describes the case mobile stations communicate with each other during non-access time.

Figure 12:
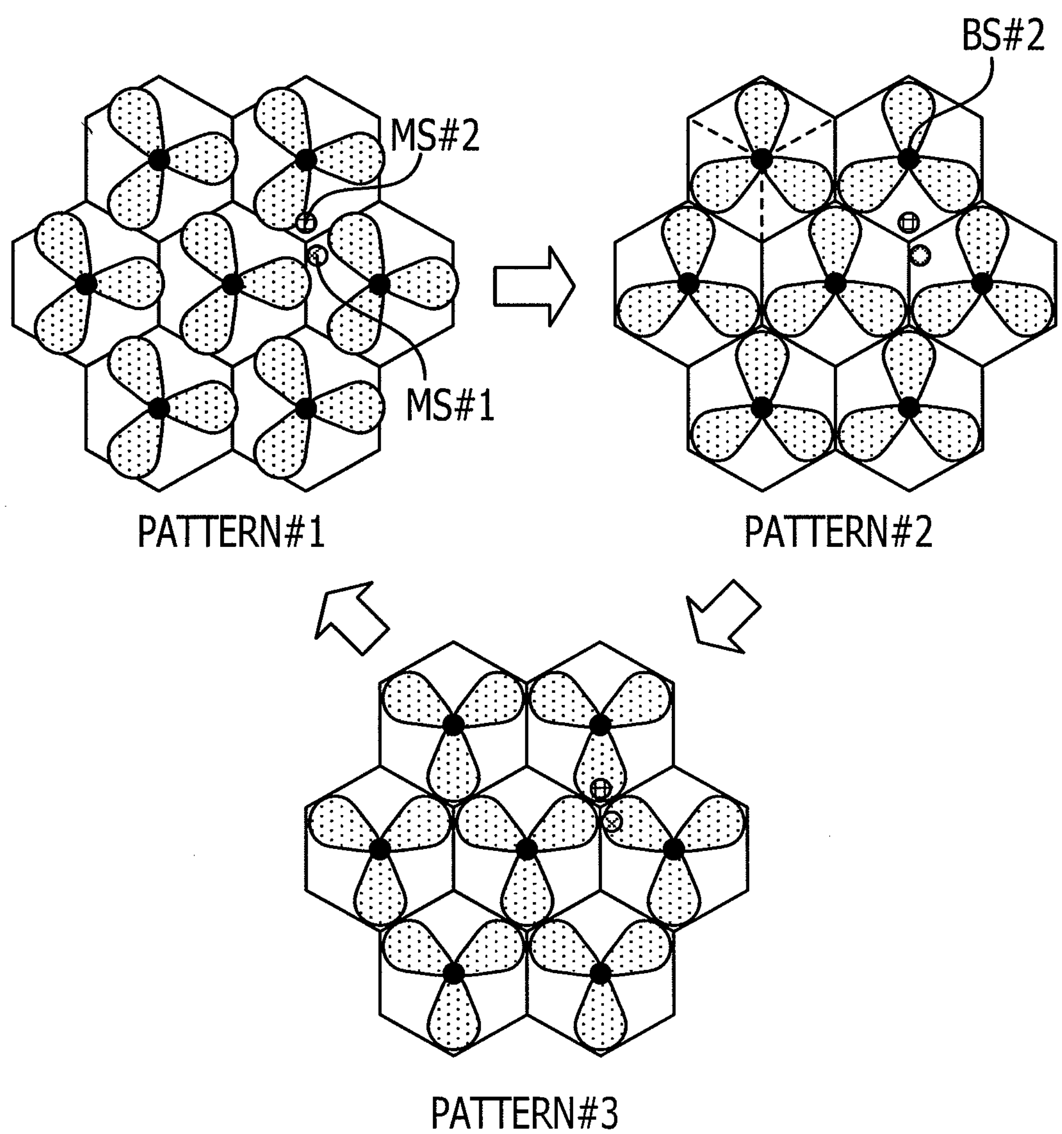
FIG. 12 is a diagram for explaining an example of the allocation timing for communication with respect to mobile stations by a base station in accordance with Embodiment 4.
Figure 13:
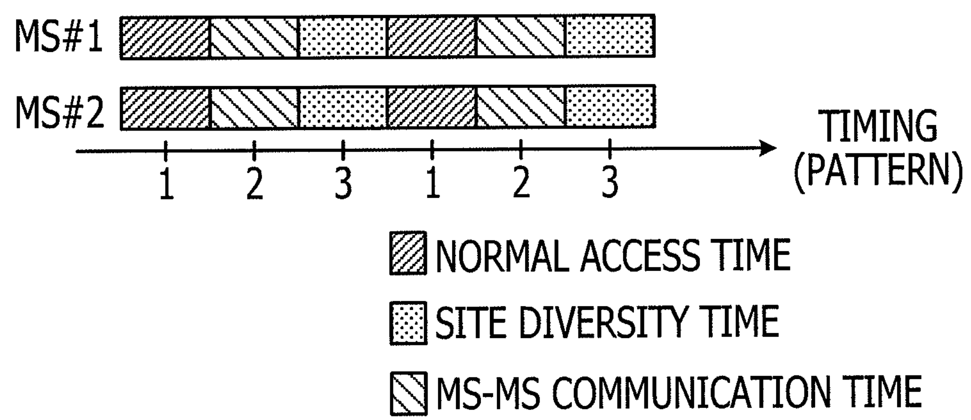
FIG. 13 is a diagram for explaining an example of the allocation details for communication with respect to mobile stations by a base station in accordance with Embodiment 4.

FIGS. 12 and 13 illustrate an example of the allocation timing for communication with respect to mobile stations by a base station 100 in accordance with Embodiment 4. FIG. 12 is a diagram for explaining an example of the allocation timing for communication with respect to mobile stations by a base station 100 in accordance with Embodiment 4. FIG. 13 is a diagram for explaining an example of the allocation details for communication with respect to mobile stations by a base station 100 in accordance with Embodiment 4. In FIG. 12, mobile stations positioned inside given cells are labeled MS#1 and MS#2. Also, base stations BS#1 to BS#7 are illustrated, similarly to FIG. 3. Since the configuration and processing flows related to a mobile station and base station in accordance with Embodiment 4 are similar to those of Embodiment 2, detailed description thereof is herein omitted.

As illustrated by way of example in FIGS. 12 and 13, when the antenna gain is the result of the beams illustrated in Pattern#1, MS#1 and MS#2 are able to access respective base stations in normal access time. It is desirable that these respective base stations be the base stations that are able to communicate with the best reception quality at each MS.

Meanwhile, when the antenna gain is the result of the beams illustrated in Pattern#2, MS#1 and MS#2 are in non-access time, and do not access a base station, for example. At this point, MS#1 and MS#2 are able to communicate with each other in the "MS-MS communication time".

During the MS-MS communication time, each mobile station sends and receives signals to and from surrounding mobile stations. When there exist mobile stations desiring communication, communication is established between the mobile stations, independently from the base stations. In addition, the protocol for communication between a BS and an MS differs from the protocol for communication between an MS and another MS. For this reason, interference power can be reduced during non-access time. Herein, communication between the mobile stations may be performed by the communication unit 277, for example.

Meanwhile, when the antenna gain is the result of the beams illustrated in Pattern#3, MS#1 and MS#2 are in site diversity time, and conduct site diversity to combine signals from a plurality of BSs, for example.

As described above, in a wireless communication system, mobile stations independently communicate with each other during non-access time, thereby making it possible to improve the throughput of the wireless communication system as a whole, and without producing interference with respect to different communication protocols.

Embodiment 5

The above Embodiments 2 to 4 describe the case where the regions formed by the beams emitted from base stations constitute a single communication protocol (i.e., cellular communication). However, it is also possible to emit beams compatible with a plurality of communication protocols. For this reason, the following may describe the case of emitting beams compatible with a plurality of communication protocols.

Figure 14:
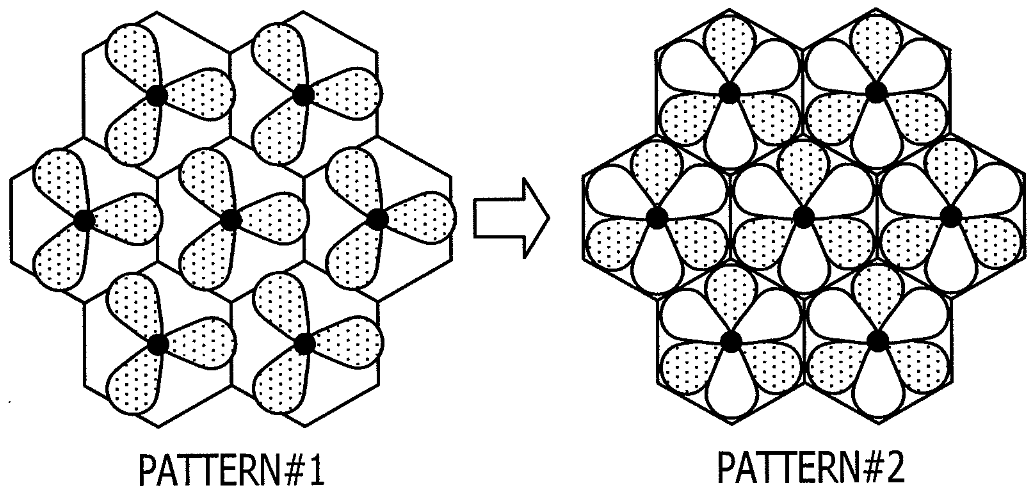
FIG. 14 is a diagram for explaining an example of switching the beams emitted by a base station in accordance with Embodiment 5.
Figure 14:
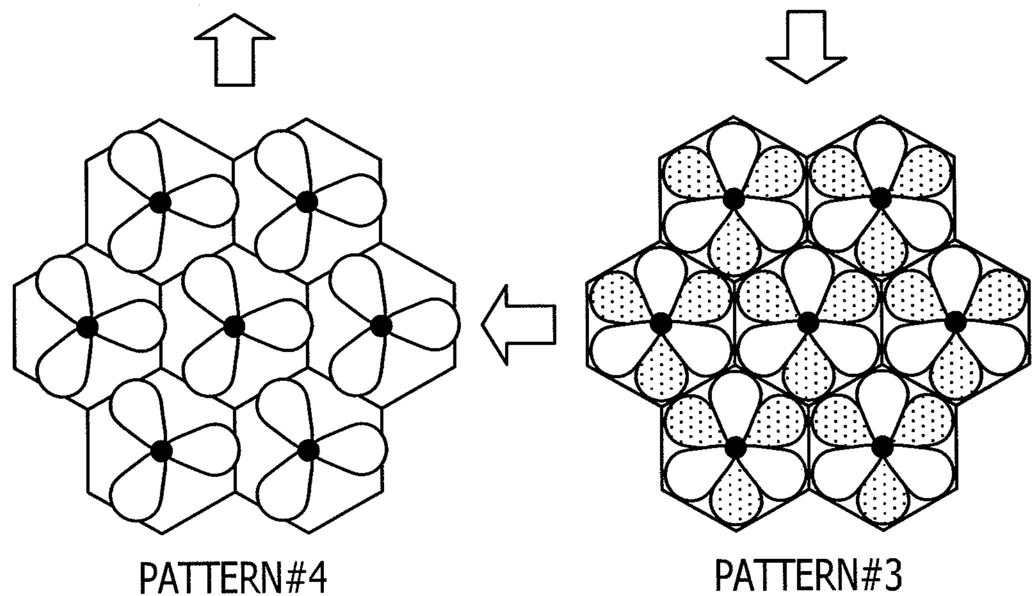
Figure 14:
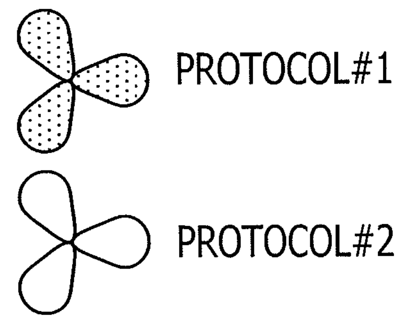

FIG. 14 illustrates an example of switching the beams emitted by a base station 100 in accordance with Embodiment 5. FIG. 14 is a diagram for explaining an example of switching the beams emitted by a base station 100 in accordance with Embodiment 5. Since the configuration and processing flows related to a base station 100 and a mobile station in accordance with Embodiment 5 are similar to those of Embodiment 2, detailed description thereof is herein omitted. More specifically, the configuration differs only in the configuration of the directional antenna 102 of the base station 100, and the configuration for making the mobile station 150 compatible with a plurality of communication protocols (for example, the configuration for a single communication protocol may be simply duplicated in a redundant configuration). Similarly to FIG. 3, FIG. 14 illustrates an example wherein base stations BS#1 to BS#7 form cells and sectors, with beams being emitted by each BS.

As illustrated by way of example in FIG. 14, beam switching involves BS#1 to BS#7 changing the direction of their directional antennas in synchronization for each communication protocol, and at a given cycle period illustrated in Pattern#1 to Pattern#4. The communication protocols in FIG. 14 are labeled Protocol#1 and Protocol#2 by way of example.

In the example illustrated in FIG. 14, each BS emits beams for each communication protocol at equal intervals so that the hexagonal cell is subdivided into three sectors every 120°. In so doing, each BS forms communication regions where the antenna gain is maximized, as well as communication regions where the antenna gain is minimized. These communication regions exist at the cell edges near the points where the hexagonal vertices meet.

Also, in the example illustrated in FIG. 14, the communication regions wherein the antenna gain is maximized or minimized for mobile stations positioned at the cell edges are produced during Pattern#2 and Pattern#3. In contrast, in the example illustrated in FIG. 14, the communication regions wherein the antenna gain is maximized or minimized are not produced during Pattern#1 and Pattern#4. In addition, the mobile stations perform processing similar to that of Embodiment 2 for each communication protocol.

As described above, in a wireless communication system, beams for different cellular communication protocols are alternately emitted in synchronization with surrounding base stations at a given cycle period, and scheduling is conducted by base stations based on a per-cycle access method obtained from factors such as the reception quality for each mobile station. Furthermore, by means of the scheduling conducted by the base stations, throughput is efficiently improved as a result of site diversity conducted for each different cellular communication protocol by mobile stations positioned at the edges of cells. Given such advantages, reception quality can be further improved in the wireless communication system, even when different cellular communication protocols co-exist in the same communication environment.

Embodiment 6

The foregoing thus describes embodiments of the wireless communication method, base station, and mobile station disclosed herein. However, it should be appreciated that a variety of different embodiments other than those described above may also be realized. Different embodiments may be described for (1) the antennas, (2) the beams, and (3) the per-device configuration.

(1) Antennas

In the foregoing embodiments, a communication antenna at a base station and a communication antenna at a mobile station are described as sending and receiving various information. However, these communication antennas may also be split into separate communication antennas for transmission and reception. Moreover, the number of directional antennas installed at a base station may be modified according to apparatus specifications and the communication regions to be formed.

(2) Beams

In the foregoing embodiments, beams are described as cycling from Pattern#1 to Pattern#3 or from Pattern#1 to Pattern#4 at particular beam switching timings. However, the patterns cycled at the beam switching timings are not limited to the above, and may be modified according to factors such as the number of beams used to form a communication region as well as the arrangement of the respective base stations.

(3) Per-Device Configuration

Except where otherwise noted, changes may be made to the information expressed in the foregoing text and in the drawings, including processing sequences, control sequences, specific names, various data, and parameters (such as the specific names of access methods, for example).

Furthermore, the respective component elements of the base station and mobile station are illustrated herein as functional schematics, and are not required to be physically configured in the manner illustrated in the drawings. In other words, the specific configuration in which individual components are separated or integrated is not limited to that illustrated in the drawings, and all or part of the components herein may be functionally or physically separated or integrated in units according to particular factors, such as various load and usage conditions. For example, the communication allocator 124 and the frame generator 125 may be integrated as a scheduling unit that conducts scheduling with respect to mobile stations, and in addition generates wireless frames containing the scheduling information and then sends the frames to mobile stations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to any illustration of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method used in a wireless communication system including base stations and mobile stations, the method comprising:

respectively forming, at each base station, first communication regions and second communication regions at edges of a cell of the each base station by changing a direction of a directional antenna in synchronization with other surrounding base stations at a given cycle period, wherein each first communication region is configured so that a first level is reached in an antenna gain between sectors contained in the cell of the each base station and the sectors included in the cells of the other surrounding base stations, and wherein each second communication region is configured so that a second level lower than the first level is reached in the antenna gain; and combining signals, at each mobile station, from a given plurality of base stations during a time period in which a sum of incoming signal levels from the given plurality of base stations satisfies given conditions.

2. The wireless communication method according to claim 1, wherein the combining comprises combining signals from the given plurality of base stations during a time period in which the antenna gain between the incoming signal level from a single, given base station and the sum of the incoming signal levels from the given plurality of base stations becomes equal to or greater than a given gain.

3. The wireless communication method according to claim 2, further comprising:

at each mobile station, if the antenna gain is less than the given gain, and if the sum of incoming signal levels from the plurality of base stations is less than a given level, then the mobile station communicates with a transponder that relays access by the mobile station to the single, given base station, or alternatively, the mobile station communicates with other mobile stations.

4. The wireless communication method according to claim 1, wherein the forming comprises forming the first and second communication regions at the edges of the cell of the each base station so that the antenna gain is maximized in the first communication regions and minimized in the second communication regions.

5. The wireless communication method according to claim 1, further comprising:

at a mobile station, computing a reception quality at the mobile station based on a reference signal transmitted each time the direction of the directional antennas is changed as a result of forming the first and second communication regions;

selecting a diversity-based access method with respect to the base stations based on the computed reception quality;

issuing device information from the mobile station to one or more base stations, the device information containing the computed reception quality, as well as the selected diversity-based access method; and at the one or more base stations, allocating resources to the mobile station with priority based on the issued device information.

6. The wireless communication method according to claim 1, wherein the forming comprises forming the first and second communication regions at the edges of the base station's cell by changing the direction of the directional antenna in accordance with a plurality of different communication protocols, so that the communication regions are formed for each of the plurality of different communication protocols.

7. A base station that communicates wirelessly, comprising:

a memory; and a processor coupled to the memory configured to respectively form first communication regions and second communication regions at edges of the base station's cell by changing a direction of a directional antenna in synchronization with other surrounding base stations at a given cycle period, wherein each first communication region is configured so that a first level is reached in an antenna gain between sectors contained in the cell of the base station and the sectors included in the cells of the other surrounding base stations, and wherein each second communication region is configured so that a second level lower than the first level is reached in the antenna gain.

8. The base station according to claim 7, wherein the processor is configured to respectively form communication regions where the antenna gain is maximized and communication regions where the antenna gain is minimized at the edges of the base station's cell.

9. A mobile station that communicates wirelessly, comprising:

a memory; and a processor coupled to the memory configured to combine signals from a plurality of base stations during a time period in which a sum of incoming signal levels from the plurality of base stations satisfies given conditions; wherein the plurality of base stations are from among base stations that are each configured to respectively form first communication regions and second communication regions at edges of the base station's cell by changing a direction of a directional antenna in synchronization with other surrounding base stations at a given cycle period, wherein each first communication region is configured so that a first level is reached in an antenna gain, and wherein each second communication region is configured so that a second level lower than the first level is reached in the antenna gain.

10. The mobile station according to claim 9, wherein the processor is configured to combine signals from the plurality of base stations during a time period in which the antenna gain between the incoming signal level from a single, given base station and the sum of the incoming signal levels from the plurality of base stations becomes equal to or greater than a given gain.

11. The mobile station according to claim 9, wherein the processor is configured to combine signals from the plurality of base stations during a time period in which the sum of incoming signal levels from the plurality of base stations satisfies given conditions, and the plurality of base stations are from among base stations that are each configured to respectively form communication regions where the antenna gain is maximized and communication regions where the antenna gain is minimized at the edges of the base station's cell.

12. The mobile station according to claim 11, wherein the processor is configured to combine signals from the plurality of base stations during a time period in which the antenna gain between the incoming signal level from a single, given base station and the sum of the incoming signal levels from the plurality of base stations becomes equal to or greater than a given gain.

13. A wireless communication system, comprising:

one or more base stations; and one or more mobile stations;

wherein each base station is configured to respectively form first communication regions and second communication regions at edges of the each base station's cell by changing a direction of a directional antenna in synchronization with other surrounding base stations at a given cycle period, wherein each first communication region is configured so that a first level is reached in an antenna gain between sectors contained in the cell of the each base station and the sectors included in the cells of the other surrounding base stations, and wherein each second communication region is configured so that a second level lower than the first level is reached in the antenna gain, and each mobile station is configured to combine signals from a given plurality of base stations during a time period in which a sum of incoming signal levels from the given plurality of base stations satisfies given conditions.

* * * * *